Feb. 18, 1958   J. ROSAN   2,823,574
SELF-TAPPING FASTENER
Filed Aug. 9, 1954   2 Sheets-Sheet 1

INVENTOR.
JOSEPH ROSAN
BY Lyon & Lyon
ATTORNEYS

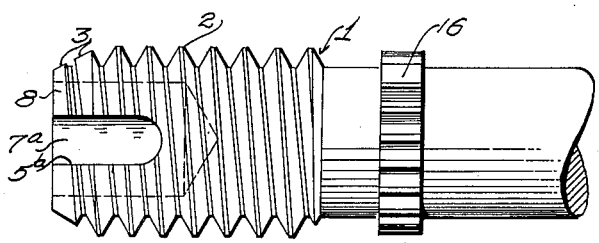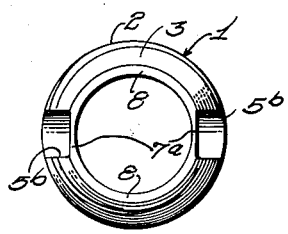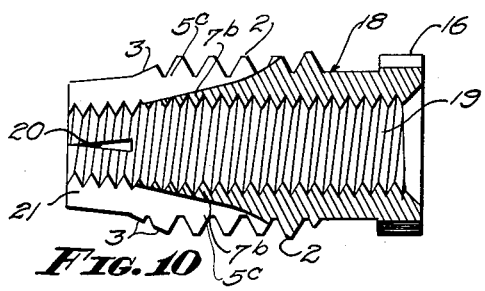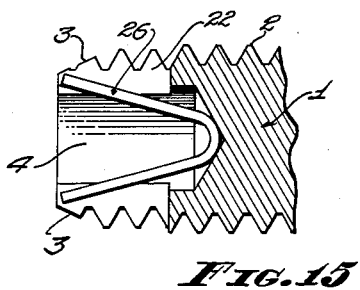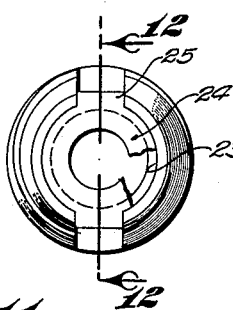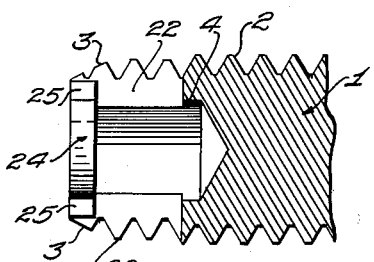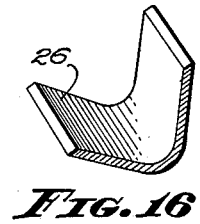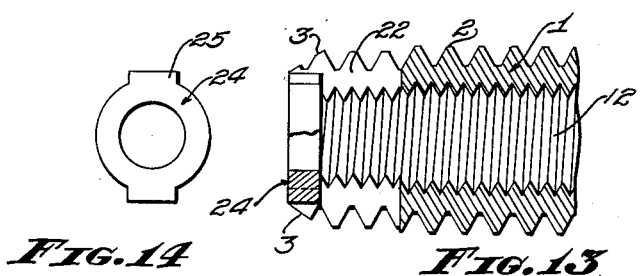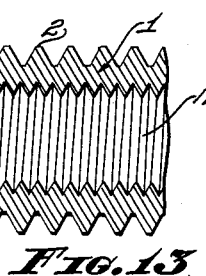
INVENTOR.
JOSEPH ROSAN
BY
ATTORNEYS

United States Patent Office 2,823,574
Patented Feb. 18, 1958

2,823,574

SELF-TAPPING FASTENER

Joseph Rosan, Newport Beach, Calif.

Application August 9, 1954, Serial No. 448,526

8 Claims. (Cl. 85—47)

My invention relates to self-tapping fasteners, more particularly to inserts and stud mountings adapted to self-tap or cut screw threads into the material in which they are to be anchored.

Included in the objects of my invention are:

First, to provide a self-tapping fastener which is provided with a special tapping end involving one or more transverse slots and intervening segments reinforced against radial collapse, but capable of lateral displacement in a manner to present their cutting edges in proper relation to the surrounding material to cut a screw thread.

Second, to provide a self-tapping fastener which incorporates a novel screw-thread construction wherein a first series of screw threads following the self-tapping end are slightly reduced in outside diameter, and the following series of screw threads are slightly larger in diameter so that their tips have a predetermined interference fit with the screw thread cut by the self-tapping end so as to ensure against loosening of the fastener; however, permitting removal when desired.

Third, to provide a means and method of locking a self-tapping fastener wherein the last screw threads to enter the fastener-receiving socket have an interference fit with the screw threads, and wherein a replacement fastener is provided with at least one additional screw thread arranged for interference fit so as to restrain the replacement fastener against accidental loosening.

Fourth, to provide a self-tapping fastener which may incorporate the serrated locking means disclosed in my previous Patent No. 2,400,318, issued May 14, 1946.

With the above and other objects in view, as may appear hereinafter, reference is directed to the accompanying drawings, in which:

Fig. 9 is a fragmentary view of a modified form of my self-tapping fastener shown arranged for use with a stud;

Fig. 9a is an end view of the self-tapping fastener shown in Fig. 9;

Fig. 10 is a longitudinal sectional view of another modified form of my self-tapping fastener shown arranged as an insert with internal screw threads;

Fig. 11 is an end view of a further modified form of my self-tapping fastener;

Fig. 12 is a fragmentary sectional view thereof, through 12—12 of Fig. 11;

Fig. 13 is a fragmentary sectional view similar to Fig. 12, showing an internally-threaded insert type of fastener;

Fig. 14 is an end view of the reinforcing ring employed in the construction shown in Fig. 13;

Fig. 15 is a fragmentary sectional view similar to Fig. 12, showing a modified form of reinforcing element; and Fig. 16 is a perspective view of the reinforcing element shown in Fig. 15.

Figure 1:
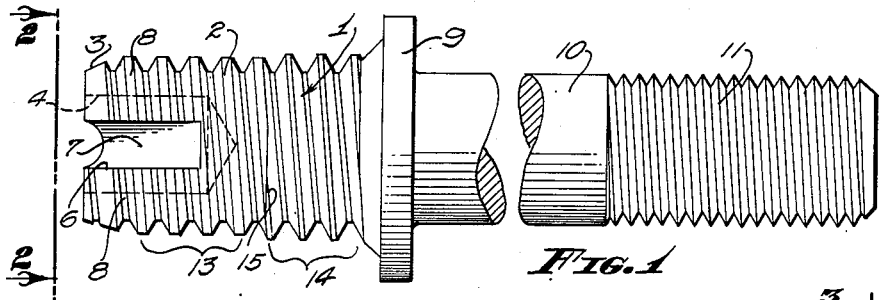
Figure 1 is a side view of one embodiment of my invention, shown incorporated in a self-tapping stud.
Figures 2, 3:
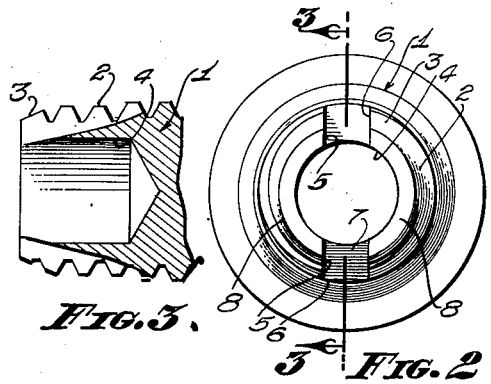
Fig. 2 is an end view thereof, taken from 2—2 of Fig. 1.
Fig. 3 is a fragmentary sectional view thereof, taken through 3—3 of Fig. 2.

Reference is first directed to Figs. 1, 2, and 3. The construction here shown includes a body 1 having screw threads 2 terminating in a beveled end 3 forming thread-cutting screw threads. A socket 4 is formed in the end of the body 1.

Cut into the sides of the body 1 are slots 5 whose outer ends intersect the socket 4 a slight distance from the extremity of the body. The edges of the thread-cutting screw threads at the beveled end 3 intersect the slots 5. Formed at the leading edges of the sockets are thread-cutting edges 6. The beveled end 3 preferably occupies between one and one-half and two convolutions of the screw thread so that virtually the entire thread-cutting operation is performed by these first convolutions of the screw threads 2. The slots 5, being cut at an acute angle with respect to the axis of the socket 4, form intervening webs 7 attenuating toward the end of the body and which extend to within a pitch or pitch and a half of the end of the body so that the tip of the body 1 is strongly reinforced against radial collapse. In other words, the webs 7 gradually decrease in thickness toward the outer end of the slots 5. Thus the arcuate sections designated 8 between the slots 5 are prevenetd from appreciable radial deformations so that the screw-cutting screw threads cut a full screw diameter thread into which the following screw threads may enter. The webs 7 are preferably cut with a milling cutter, thus their outward faces are concave and their outer ends terminate in a thin edge.

Figure 7:
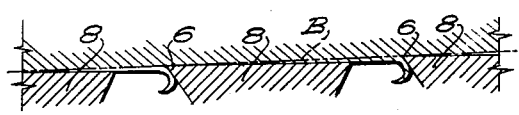
Fig. 7 is a fragmentary developed view of the cutting tip, illustrating the cutting action.
Figure 6:
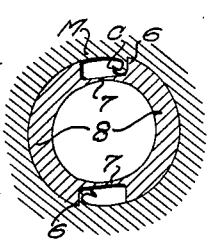
Fig. 6 is a diagrammatical sectional view similar to Fig. 5, but taken in a transverse plane and showing the cutting tip of the fastener in a surrounding body of material.

If a section is taken along the pitch line of the thread-cutting screw threads, it will be found that the trailing edges of the sections 8 have a greater radial extent than the leading or cutting edges 6. Thus, as the sections 8 tend to follow in the thread or portion of thread cut by the corresponding cutting edge 6, pressure is exerted which tends to twist the section 8 or force it laterally, as indicated by the arrows A in Fig. 5, forcing the cutting edges 6 radially outward and improving their cutting action. The result is that if a diametrical cross section is taken, the cutting edges 6 are radially displaced from the trailing edges of the sections 8, as shown in Fig. 6, so that chips C from a surrounding body of material M may be readily cut. This action is also illustrated in Fig. 7 wherein the normal surface of the sections 8 are indicated by broken lines B and the displaced surfaces are shown by solid lines. It will be observed, particularly from Fig. 6, that the cutting edges 6 have a positive rake angle which is conducive to clean cutting, rather than rolling or metal displacement, to form the threads on the material M.

It will be observed that while the webs 7 are capable of withstanding a substantial crushing force, they are capable of twisting the slight amount required to permit the desired offsetting of the sections 8. The size of the socket 4, and hence the wall thickness of the sections 8, is so selected as to permit this deflection of the sections.

The embodiment shown in Fig. 1 is provided with a flange 9 to limit the depth to which the body is screw-threaded into surrounding material, and is provided with a stud 10 having external screw threads 11.

Figure 4:
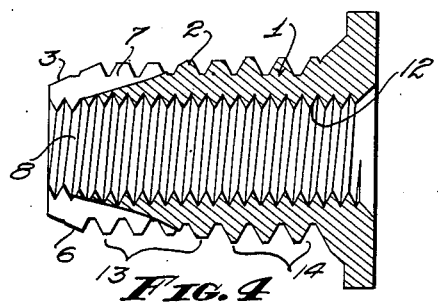
Fig. 4 is a longitudinal sectional view illustrating my invention, incorporated in an insert having internal screw threads in place of a projecting stud.

Reference is now directed to Fig. 4. This construction is essentially the same as the first described structure except that in place of the stud 10 the body 1 is provided with internal screw threads 12.

In both of the constructions illustrated in Figs. 1 and 4 the screw threads 2 are divided into two groups. Those which follow the beveled end 3 have reduced crests as indicated by 13, that is, the outside diameter of these threads is slightly less than the normal diameter, and the final screw threads have full crests as indicated by 14.

The transition portion indicated by 15 between the reduced crest screw threads 13 and full crest screw threads 14 is not constructed as a thread-cutting element, so that the full crest screw threads must be forced into the path provided by the reduced crest screw threads and provide an interference fit.

The amount of torque required to force the fastener into place is predetermined by the material into which the fastener is to be placed and the relative diameters of the reduced crest screw threads and the full crest screw threads. Inasmuch as the thread-cutting element is an integral part of the fastener, there is almost exact matching of the screw threads. Therefore, irrespective of the tolerance variation of the fastener as a whole, the tolerance between the relative dimensions of the reduced crest screw threads 13 and full crest screw threads 14 may be held to extremely close limits, so that the torque requirements to secure the fastener in place can be accurately predicted. This would not be the case if the screw threads were cut by a tool separate from the fastener itself.

The screw thread profile illustrated herein is that of the U. S. Standard, which is a slightly truncated V-thread. It should be noted, however, that my invention is not limited to U. S. Standard screw threads, but is adaptable to most of the conventional screw thread systems whether involving a full V-thread, truncated V-thread, or rounded V-thread.

In the smaller sizes of my self-tapping fastener, a pair of slots 5 is sufficient. In larger sizes, as shown in Fig. 8, two or more pairs of slots 5a may be employed.

Reference is now directed to Figs. 9 and 9a. The construction here shown is adapted to be employed as a locking means for my serrated locking ring disclosed more fully in my previous Patent No. 2,400,318. In this construction the body 1 may be the same as in the first described structure except that the flange 9 is omitted and the reduced crest screw threads 13 are not required. Instead, the stud 10 is provided with a serrated flange 16 spaced from the screw threads 2 and arranged for cooperation with the locking ring, as shown in my aforementioned patent.

The slot and its web may be identical to that shown in Fig. 1; however, modified slots 5b are shown. These are cut by an end mill so that the depth of the slot is uniform and the web 7a thus formed is likewise of uniform thickness. Still further, and this is also true of the first described structure, the transverse profile of the slot may be rectangular or rounded at the corners, or otherwise shaped as desired. The web may continue to the end of the body, or, if desired, terminate short of the end as in the first described structure. In any event, the web must be sufficiently thin to flex and permit the sections 8 to twist laterally as aforedescribed, while the threads are being cut.

Reference is now directed to Fig. 10. The construction here shown is also arranged for use with a locking ring, as shown in the aforementioned patent. While the construction here shown may be similar to Fig. 4 with a serrated flange 16 substituted for the flange 9, the construction has been further modified to show the manner in which a screw retainer feature may be incorporated.

More particularly, Fig. 10 illustrates an insert having a tubular body 18 with internal screw threads 19. Adjacent its inner end the tubular body is provided with axial slits 20, and the intervening sections are pressed inwardly to form a tapered tip 21 and to correspondingly taper the screw threads within the tip 21. Externally, the insert body 18 is provided with screw threads 2 including the beveled end cutting portion 3, as in the first described structure, and is provided with slots 5c located at right angles to the axial slits 20. Also as in the first described structure, the slots 5b are reinforced by webs 7b.

The arrangement shown in Fig. 10 is screw-threaded through a socket somewhat deeper than the insert so that the screw fitted into the internal threads 19 may pass beyond the tapered tip 21 the distance of one or two screw threads so that a firm grip may be provided.

Reference is now directed to Figs. 11 and 12. The construction here shown is essentially the same as in Fig. 1 or Fig. 9. In this case the body 1 is provided with transverse slots 22 which are cut diametrically without the provision of webs to support the intervening sections against collapse. Instead, the socket 4 is provided with a counterbore 23 which receives a reinforcing ring 24 having positioning lugs 25 adapted to extend into the slots 22 at the outer ends thereof. With this arrangement the cutting tip of the fastener is prevented from radial collapse, but the lateral displacement referred to in Figs. 5, 6, and 7 may occur. In this connection it should be noted that while the lugs 25 are wedged in the slots, the ring itself may be provided with sufficient clearance to permit the necessary lateral offsetting of the segments 8.

Reference is now directed to Figs. 13 and 14. This construction is essentially the same as in Fig. 12 except that the slots 22 and ring 24 are shown in connection with an internally screw-threaded fastener, such as illustrated in Fig. 4.

Figure 5:
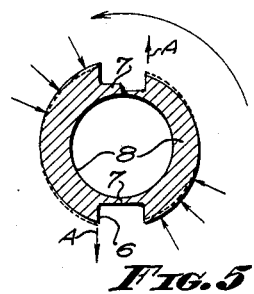
Fig. 5 is a diagrammatical sectional view, taken along the pitch line of the cutting threads of my self-tapping screw to illustrate the forces which displace portions of the cutting tip to facilitate the screw-thread cutting action.

Reference is now directed to Figs. 15 and 16. In place of the ring 24 a U-shaped reinforcing element or spacer 26 may be employed which may be inserted in the socket 4 with the extremities of its legs interposed in the slots 22. Again, the spacer 26 prevents radial collapse, but permits the radial offset movement as illustrated in Figs. 5, 6, and 7.

If it is desired to replace the fastener shown in Figs. 1 and 4, the replacing fastener is identically constructed except that the number of screw threads of full crest 14 is increased by one or more so as to provide interference fit with the internal screw threads previously engaged only by the reduced crest screw threads 13.

Figure 8A:
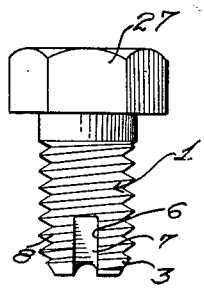
Fig. 8a is a reduced elevational view of my self-tapping fastener shown with a bolt head.
Figure 8:
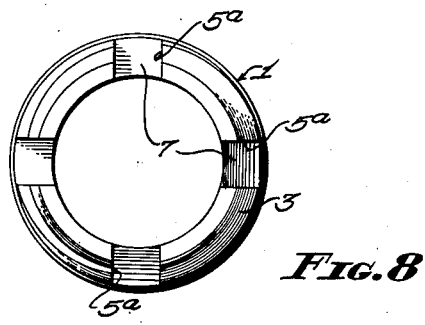
Fig. 8 is an end view similar to Fig. 2, showing an increased number of chip clearance slots as employed in the larger sizes of my self-tapping fastener.

In place of a stud as shown in Fig. 1 or internal screw threads as shown in Fig. 4, the body member may have a bolt head 27 as shown in Fig. 8a. Or, depending upon the size and use of the fastener, an "Allen" head, "Phillips" head, fillister head, round head, countersink head, or other conventional screw or bolt head may be employed. In some cases no head or flange need be employed. In some cases, and particularly in connection with the inserts of Figs. 4, 10 and 13, it may be desirable to use a driving tool having a socket end with internal serrations engageable with serrations 16 in order to provide desired torque for tapping. Such tools are described in my prior patents, Numbers 2,550,866 and 2,550,867.

Having fully described my invention, it is to be understood that I do not wish to be limited to the details herein set forth, but my invention is of the full scope of the appended claims.

I claim:

1. A self-tapping fastener adapted to tap a mating screw thread in a circular bore, comprising: a cylindrical body member having a recess extending inwardly from one extremity thereof and having external screw threads, at least the first of said screw threads at said one extremity being beveled, said body member also having at least two circumferentially spaced slots extending parallel with the axis of said fastener starting from said one extremity and extending across and beyond the beveled portion of said body member to interrupt the external screw threads thereon, said recess extending into said body for a distance at least substantially as great as the length of said slots and cooperating with said slots to provide arcuate sections at said one extremity, each of said slots having confronting side walls with one side wall of each slot constituting the leading edge of the interrupted screw threads and lying in a plane extending substantially parallel with a diametrical line passing through the axis of said fastener and forming thread cutting edges, at least said one beveled interrupted screw thread progressively increasing in radius from its leading-cutting edges at one slot to its trailing edge at the succeeding slot, said external screw threads including a first series of threads adjacent the beveled screw thread having truncated crests of a diameter less than the normal diameter for a given thread size, certain of said truncated threads nearest said beveled thread being intersected by said slots, said external screw threads also including a second series of threads adjacent said first series of threads having unreduced crests of normal diameter for said given thread size; an integral yieldable web extending across each slot between said side walls and interconnecting said arcuate sections to provide a flexible cutting tip for the fastener, said webs gradually decreasing in thickness in the direction toward said one extremity of said body member and terminating in a thin outer end, said webs in normal use being capable of withstanding a substantial crushing force and also being capable of twisting a slight amount while being driven to permit lateral offsetting of said arcuate sections, so that upon driving said body member into a circular bore, pressure is exerted by the surrounding material on said interrupted screw threads to distort said webs and relatively laterally offset the sides of the respective slots and force the leading-cutting edges of said interrupted screw threads into cutting engagement with the surrounding material and an interference fit is obtained when said second series of screw threads follow into the screw threads made by said cutting edges of said beveled and truncated threads.

2. A self-tapping fastener as set forth in claim 1, wherein the outer end of the webs originate at the one extremity of the body member.

3. A self-tapping fastener as set forth in claim 1, wherein the outer end of the slots intersect the recess in the one extremity of the body member at a location such that the outer end of the webs is spaced inwardly from said one extremity of said body member a distance equal to about one to one and one-half times the pitch of the external screw threads.

4. A self-tapping fastener as set forth in claim 1, wherein the recess is an internally screw threaded bore extending through the body member.

5. A self-tapping fastener as set forth in claim 1, wherein the recess in the one extremity of the body member is a socket of a depth at least substantially as great as the length of the slots.

6. A self-tapping fastener as set forth in claim 5, wherein an externally screw threaded stud extends from the other end of the body member.

7. A self-tapping fastener as set forth in claim 1, wherein the recess is an internally screw threaded bore extending through the body member, and wherein said body member includes a pilot portion of reduced outside diameter at the one extremity disposed in advance of said screw cutting edges, said pilot portion having axial slots and being radially compressed to taper said internal screw threaded bore for yieldable engagement with an inserted screw.

8. A self-tapping fastener as set forth in claim 1, wherein the body member is provided with a serrated flange engageable by a driving tool to drive the fastener in place.

References Cited in the file of this patent

UNITED STATES PATENTS

| | | |
|---|---|---|
| 226,450 | Ibbotson et al. | Apr. 13, 1880 |
| 1,905,665 | Weatherhead et al. | Apr. 25, 1933 |
| 2,093,171 | Olson | Sept. 14, 1937 |
| 2,190,174 | MacDonald | Feb. 13, 1940 |
| 2,400,318 | Rosan | May 14, 1946 |
| 2,455,885 | Theurer | Dec. 7, 1948 |

FOREIGN PATENTS

| | | |
|---|---|---|
| 668,818 | Great Britain | Mar. 19, 1952 |